May 21, 1963 J. CROWTHER 3,090,515
MEANS FOR LOADING AND DISCHARGING BULK LOADS
Filed July 5, 1960 4 Sheets-Sheet 1

May 21, 1963  J. CROWTHER  3,090,515
MEANS FOR LOADING AND DISCHARGING BULK LOADS
Filed July 5, 1960  4 Sheets-Sheet 4

United States Patent Office 3,090,515
Patented May 21, 1963

3,090,515
MEANS FOR LOADING AND DISCHARGING BULK LOADS
John Crowther, Coed-y-Castell, Gannock Park, Deganwy, Wales, assignor to Concrete Carrying Company Limited, Manchester, England, a British company
Filed July 5, 1960, Ser. No. 40,949
3 Claims. (Cl. 214—522)

This invention relates to means for loading and discharging bulk loads of solid materials on vehicles.

According to the invention, a main conveyor is provided in the lower part of the vehicle for feeding the material to the rear of the vehicle, and a secondary conveyor is accommodated beneath the main conveyor and can be extended when required and adjusted to a convenient position for receiving material from the main conveyor and delivering it as required.

The conveyor may be driven by hydraulic means. The main conveyor may be installed centrally beneath a vehicle body or container, to travel longitudinally towards the rear of the vehicle.

The secondary conveyor may be in the form of a movable unit adapted to be stored when not in use beneath the main conveyor, and to be drawn out when required. The end of the secondary conveyor can be centralised under the discharging end of the main conveyor, and the secondary conveyor can be turned to deliver in various directions and can be swung upwards to raise the material being discharged. There may be a hydraulic jack or other device at the back of the vehicle body adapted to be connected to the conveyor frame for raising same to any desired angle.

The secondary conveyor can be reversed and placed in such a position as to be capable of reloading the vehicle if required. It may also be detached from the vehicle and coupled to the hydraulic system by extension pipes and used apart from the vehicle for conveying or elevating materials as required on a building site.

Auxiliary controls for the clutch, accelerator and power take-off may be provided at the rear of the vehicle.

Referring to the accompanying drawings.

Figure 1:
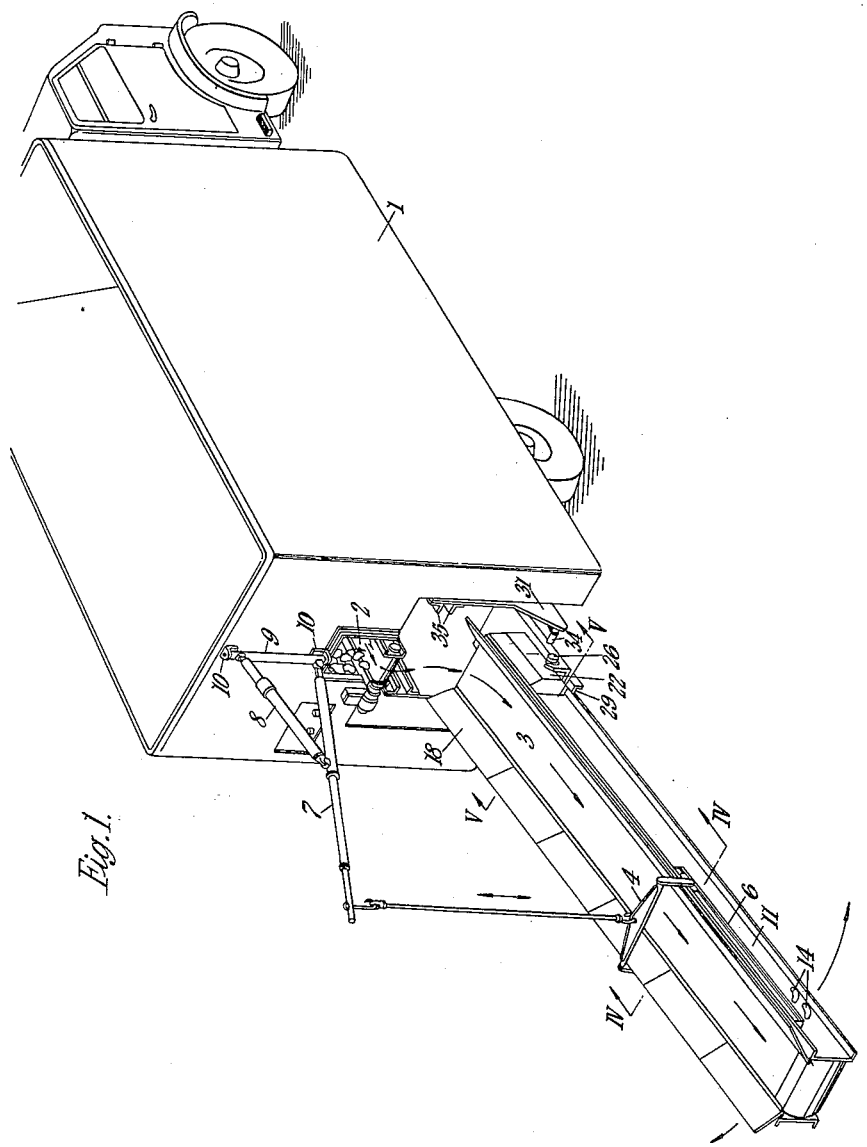
FIGURE 1 is a perspective view of a vehicle embodying the invention.
Figure 5:
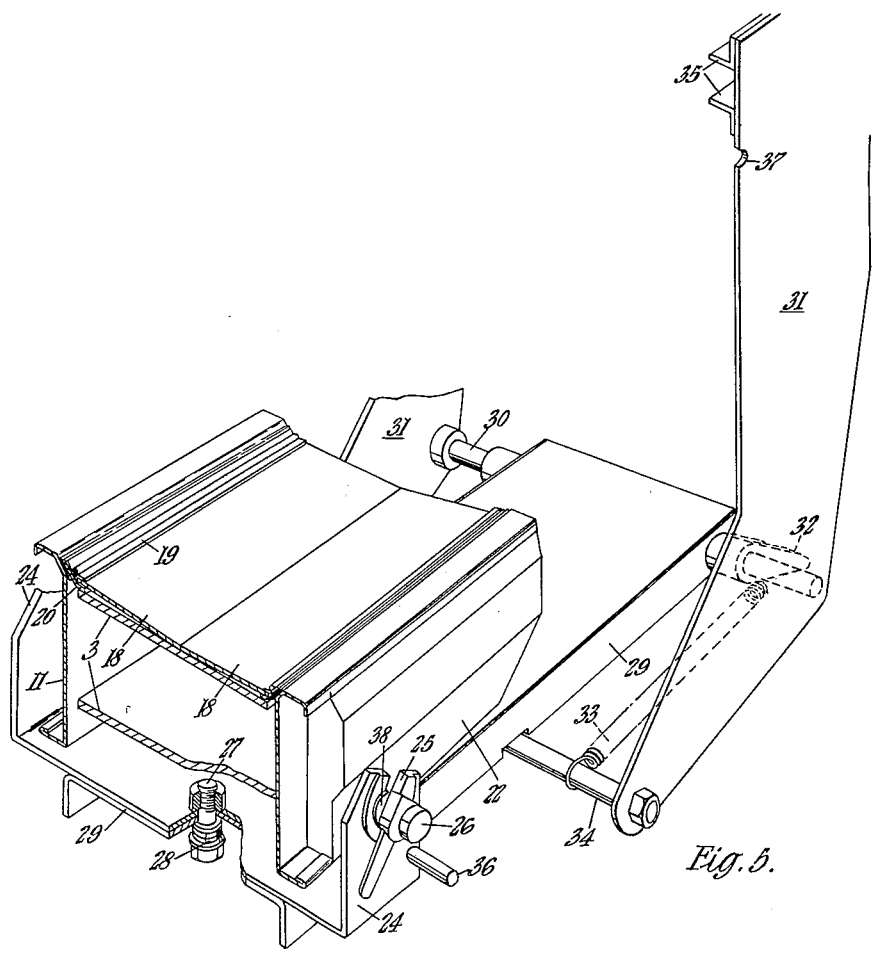
FIGURE 5 is a section on the line V—V of FIGURE 1.
Figure 2:
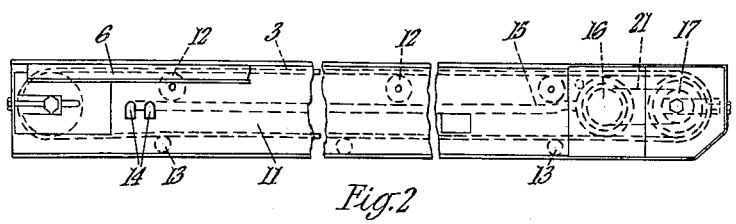
FIGURE 2 is a side view of a secondary conveyor.
Figure 3:
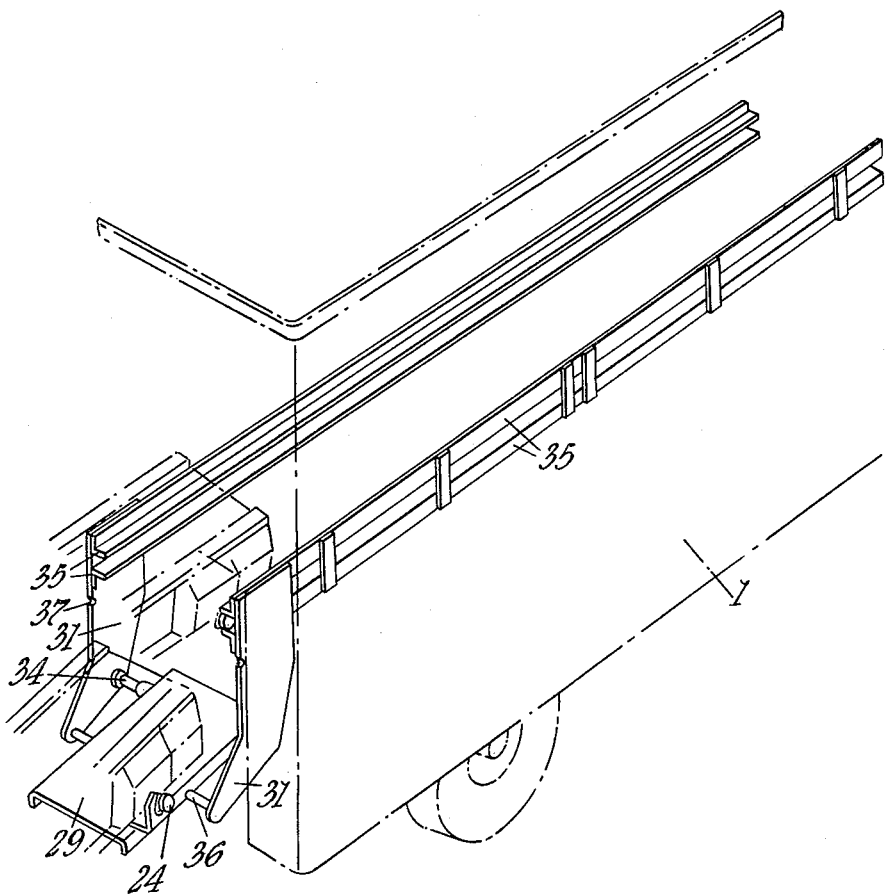
FIGURE 3 is a perspective view with the conveyors removed, showing the means for stowing the conveyor in the vehicle.

The vehicle has a body 1, the interior of which is in the form of a hopper arranged to direct material in the vehicle, such as coke, to a belt conveyor 2 disposed within the vehicle and adapted to discharge material at the back of the vehicle. Beneath the conveyor 2, there is a space in the vehicle in which a second conveyor 3 is housed, which can be drawn out into the position shown in FIGURE 1, in which it receives material discharged by the conveyor 2 and delivers it as required, the conveyor 3 being arranged to have its free end raised or lowered or swung to one side or the other. In the operative position, the conveyor 3 is supported by a yoke 4, having guide rollers 5 at its ends which run in channels 6 on the sides of the conveyor housing. The yoke 4 is suspended from a jib 7 which is extensible telescopically and can be raised or lowered by a hydraulic jack 8, and is mounted on a vertical rod 9 which can turn on brackets 10 secured to the back of the vehicle body 1.

Figure 4:
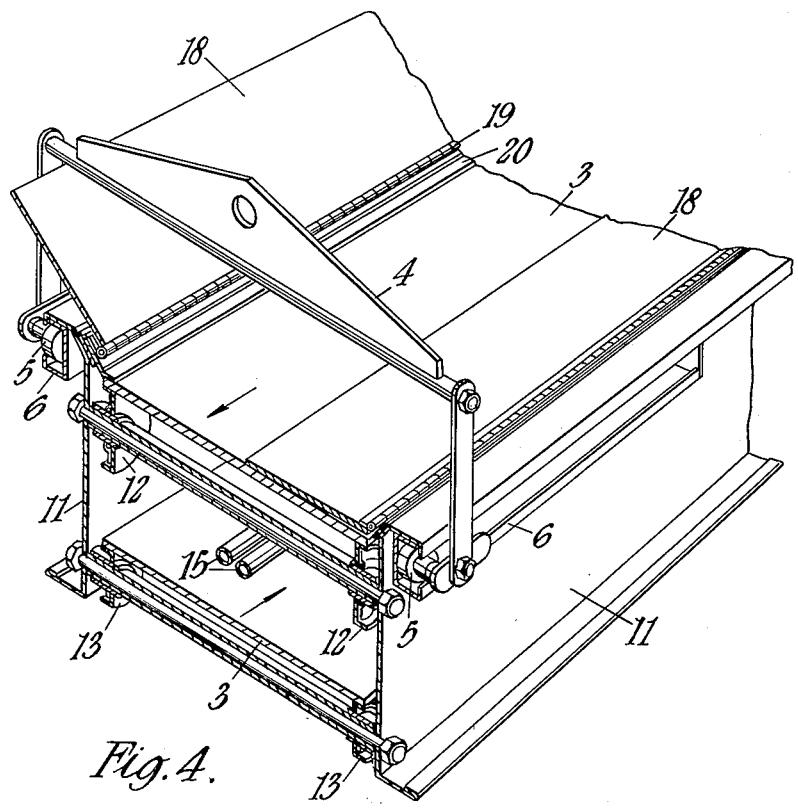
FIGURE 4 is a section on the line IV—IV of FIGURE 1.

The conveyor 3 runs in a housing comprising side plates 11 and has guide wheels 12 beneath its upper stretch and guide wheels 13 beneath its lower stretch. It is driven hydraulically, fluid being supplied through connections 14 and tubes 15 to a hydraulic motor 16 which drives the driving wheel 17 by means of a chain 21. There are sides 18 mounted on hinges 19 on the side plates 11, which lie over the belt 3 when not in use and can be opened out as shown in FIGURES 1 and 4 to form a trough while the conveyor is operating. Rubber strips 20 fitted under the hinges 19 rest on the edges of the belt 3 to prevent material escaping. The chain 21 is enclosed in a casing 22 on the outside of the conveyor housing.

In the operative position the driving end of the conveyor 3 is supported by a swivel bracket 23 having upright end parts 24 each having a slot 25 to take a pin 26 projecting from the conveyor housing. The bracket 23 is pivotally mounted by means of a bolt 27 and spring 28 on a conveyor carrier 29, enabling the conveyor to be turned to either side from its central position. The spring 28 provides sufficient tension to prevent the conveyor from swinging round when the vehicle is standing on uneven ground. The conveyor carrier 29 can turn about a shaft 30 mounted in plates 31 secured in the vehicle body on either side of the space in which the conveyor is stowed when not in use. Attached to the shaft 30 are two downwardly directed arms 32 connected by springs 33 to a rod 34 extending between the plates 31. At the top of each plate 31 two angles 35 which extend into the vehicle body and form between them a channel in which the pin 26 can slide as the conveyor is being stowed away.

Figure 6:
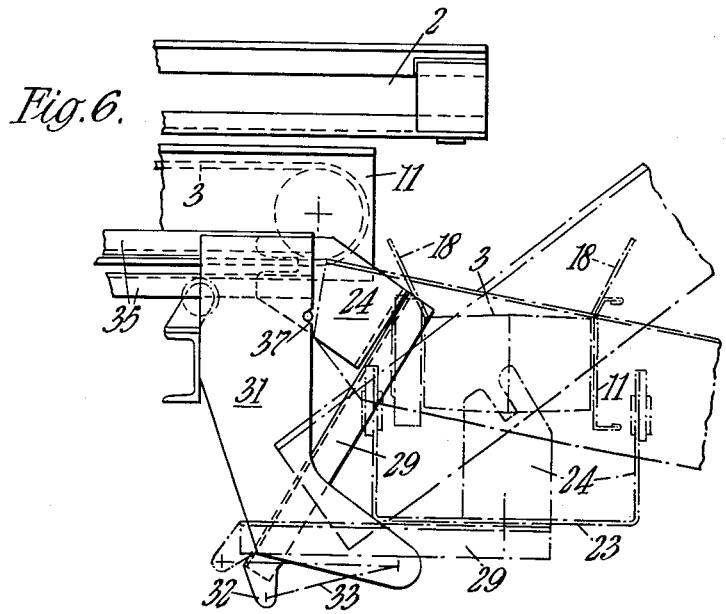
FIGURE 6 is a side view showing the arrangement of the end of the secondary conveyor.

When the conveyor is to be stowed away its driving end is lifted, and the carrier 29 is raised by the springs 33. The bracket 23 guides the end of the conveyor until a position is reached as shown in full lines in FIGURE 6, in which the slots 25 are in line with the channels between the angles 35 and the pins 26 can leave the slots and slide along in the channels. FIGURE 6 shows in broken lines the operative position of the carrier 29. FIGURE 6 also shows the conveyor in three positions namely sloping upwards, sloping downwards and swivelled through 90°. There are pins 36 projecting from the parts 24 of the swivel bracket 23, which enter recesses 37 in the plates 31 and ensure that the bracket is squared up in the raised position. The pins 26 have flat portions which enter the slots 25 and then enter slots in discs 38 which can turn in the parts 24, so that the pins 26 can only enter or leave when the conveyor is horizontal. The weight of the conveyor is largely supported by the jib 7, which is retracted as the conveyor is being stowed, after which the yoke 4 moves towards the outer ends of the channels 6 as the conveyor is moved into the vehicle.

What is claimed is:

1. Means for discharging bulk loads of solid materials from a vehicle, comprising a main conveyor disposed in the vehicle for feeding the material to the rear of the vehicle, a secondary conveyor in the form of a unit movable in a space beneath the main conveyor in the vehicle and adapted to be drawn out therefrom, a swivel bracket on the vehicle adapted to be engaged by the inner end of the secondary conveyor when drawn out and to support said end below the main conveyor so as to receive material therefrom, and a jib swingably mounted on the vehicle body for supporting the outer end of the secondary conveyor.

2. Means for discharging bulk loads of solid materials from a vehicle, comprising a main conveyor disposed in the vehicle for feeding the material to the rear of the vehicle, a secondary conveyor in the form of a unit movable in a space beneath the main conveyor in the vehicle and adapted to be drawn out therefrom, a swivel bracket on the vehicle adapted to be engaged by the inner end of the secondary conveyor when drawn out and to support said end below the main conveyor so as to receive material therefrom, and a jib swingably mounted on the vehicle body, a yoke suspended from the jib guide rollers on the yoke, and channel members on the secondary conveyor adapted to be engaged by the guide rollers.

3. Means as claimed in claim 1, having a conveyor carrier mounted in the vehicle body to swing about a horizontal axis, the swivel bracket being mounted to turn about a vertical axis on the conveyor carrier, lateral projections at the inner end of the secondary conveyor, vertical members on the swivel bracket having inclined slots in which the lateral projections can engage, and channels formed within the vehicle body beneath the main conveyor, with which the inclined slots register when the conveyor carrier is swung upwards, to guide the lateral projections into the channels in which they can slide for stowing the conveyor within the vehicle body.

References Cited in the file of this patent

UNITED STATES PATENTS

| | | |
|---|---|---|
| 606,520 | Darrah | June 28, 1898 |
| 1,452,371 | Ginther | Apr. 17, 1923 |
| 2,107,682 | Wall | Feb. 8, 1938 |
| 2,670,836 | Ball | Mar. 2, 1954 |